United States Patent
Lopez-Carrasco Picado et al.

(10) Patent No.: US 8,074,692 B2
(45) Date of Patent: Dec. 13, 2011

(54) PROCESS AND TOOLING FOR LINING MOLDS OF CURVED PIECES

(75) Inventors: Jorge Lopez-Carrasco Picado, Madrid (ES); Begona Santoro Alvarez, Madrid (ES)

(73) Assignee: Airbus Espana S.L., Madrid (ES)

( * ) Notice: Subject to any disclaimer, the term of this patent is extended or adjusted under 35 U.S.C. 154(b) by 832 days.

(21) Appl. No.: 11/794,001

(22) PCT Filed: Dec. 29, 2005

(86) PCT No.: PCT/EP2005/057213
§ 371 (c)(1),
(2), (4) Date: Apr. 2, 2008

(87) PCT Pub. No.: WO2006/070015
PCT Pub. Date: Jul. 6, 2006

(65) Prior Publication Data
US 2009/0020219 A1  Jan. 22, 2009

(30) Foreign Application Priority Data
Dec. 30, 2004 (ES) .................................. 200403147

(51) Int. Cl.
*B32B 37/00* (2006.01)

(52) U.S. Cl. ......... 156/433; 156/441; 156/523; 156/574

(58) Field of Classification Search .................. 156/166, 156/242, 245, 433, 441, 523, 574
See application file for complete search history.

(56) References Cited

U.S. PATENT DOCUMENTS

| | | | | |
|---|---|---|---|---|
| 3,574,040 A | * | 4/1971 | Chitwood et al. | 156/522 |
| 4,461,669 A | * | 7/1984 | Dontscheff | 156/574 |
| 4,696,707 A | | 9/1987 | Lewis et al. | |
| 5,394,906 A | * | 3/1995 | Farley | 139/192 |
| 5,431,749 A | | 7/1995 | Messner | |
| 5,662,855 A | * | 9/1997 | Liew et al. | 264/258 |
| 6,451,152 B1 | | 9/2002 | Holmes et al. | |
| 6,799,081 B1 | * | 9/2004 | Hale et al. | 700/98 |
| 7,120,975 B2 | * | 10/2006 | Delecroix | 28/101 |
| 7,185,404 B2 | * | 3/2007 | Delecroix | 28/101 |

FOREIGN PATENT DOCUMENTS
FR  2 635 484  2/1990

OTHER PUBLICATIONS

Flory, et al "Effect of Steering and Conformance Requirements on Automated Material Deposition Equipment" Charles Stark Draper Labrotory, Inc., Sep. 28, 2004 (from US Patent 6,799,081), pp. 1-11.*

* cited by examiner

*Primary Examiner* — Jeff Aftergut
(74) *Attorney, Agent, or Firm* — Ladas & Parry LLP

(57) ABSTRACT

The invention relates to a process and tooling for the lining of molds for curved pieces, the process comprising the application of a lining (15) of width A2 on the mold (3) in several successive passes, exerting pressure thereon so that it adapts to the curvature of the piece, and the number of passes being the minimum required so that the width A2 of the tape (15) allows achieving such adaptation, and the tooling comprising a drum (25) for applying the lining (15), a means of attaching its end to the mold (3) at the beginning of each pass, a conical roller (25), to exert pressure on the lining (15) uniformly along its entire width, and means (26, 29) for its movement through side guides (27, 28) arranged on the mold (3) parallel to the curved lines (5, 7) demarcating the piece.

5 Claims, 2 Drawing Sheets

PROCESS AND TOOLING FOR LINING MOLDS OF CURVED PIECES

FIELD OF THE INVENTION

This invention relates to a process and a tooling for lining molds of curved pieces used in the aeronautical industry.

BACKGROUND OF THE INVENTION

Lining is a process consisting of placing layers of reinforced composite in the form of linings on a mold. A very widely used example of a composite in the aeronautical industry is the preimpregnated composite, a mixture of fibrous reinforcement and polymer matrix used for manufacturing composites such that they can be stored for subsequent use.

It may be in the form of a sheet, lining, tow or fabric form. For thermosetting matrices, the resin is generally partially cured or is taken by means of another process to a controlled viscosity, called B-stage. Added elements, such as flame catalysts, inhibitors and retardants, can be added to obtain specific features in the final use and to improve the process, storage and handling features.

In this process, the linings are not randomly arranged, but they are generally arranged or placed in certain directions, specifically at 0°, 90°, 45° and −45°. The number of layers (thickness) and the arrangement of the linings in certain directions or in others are determined according to the nature and magnitude of the stresses that the piece will support at each point.

There are two types of lining: planar and curved, according to whether the surface being lined is planar or curved, respectively.

The lining process can be done manually or automatically. Machines performing lining are basically of two types:
  Lining machines: lining on planar or slightly curved surfaces.
  Fiber positioning machines: lining on surfaces with a large curvature on which lining machines cannot line.

There are mainly two criteria determining whether a part is lined manually or automatically: the material used and the dimensions of the piece.

One material used, among others, for lining is the preimpregnated material. This material is sticky and its handling is not simple. Manually adapting the preimpregnated lining to a straight line contained on a plane is not very complex, however adapting such lining to a curve is very complex since this material does not deform by itself, so the operator must constantly put pressure on the lining so that it deforms and adapts to the desired curve, with the added difficulty that the lining is sticky. Furthermore, if the number of linings to be placed is very high, the complexity ostensibly increases.

This invention comes about from the need to line a piece of the new Airbus A380 airplane, which is an ellipse carried out on a plane, resulting from the section in a cylinder with an inclined plane.

In a manufacturability test, it could be seen that the manual lining of this mold was very complex given the geometry of the curve to be lined and the high number of layers to be arranged.

The lining was also carried out with a lining machine. In these cases, given the size of the mold, a larger area is first lined, and then it continues to a cutting operation to define the curve in question. This process is not cost-effective since the machine is not being used optimally.

This invention aims to overcome the difficulties mentioned for the manual lining of said piece and the non cost-effectiveness of lining or fiber positioning machines.

SUMMARY OF THE INVENTION

This invention proposes a process and a tooling satisfactorily resolving the problems discussed above, particularly for the case of large pieces required in the aeronautical industry.

The basic problem that is considered when attempting to line a planar mold to form a curved piece of a given width with a single lining is that the lining does not precisely follow the geometry of the curve if the material of the lining does not deform by itself, as occurs in the case of the preimpregnated lining desired to be used.

To resolve this problem, the invention proposes a process consisting of applying the lining in several successive passes of a width such that, by exerting pressure on it, it adapts to the curvature of the piece to be formed and the number of passes being the minimum required to achieve such adaptation, the linings applied in each pass being bonded.

In other words, the area to be lined is divided into different regions with a width which allows correctly arranging the lining following the geometry of the curve. This width is determined by means of the suitable tests according to the curvature and the total width of the area to be lined, taking into account that it is necessary to exert pressure on the material so that it deforms and can adapt to the geometry of the curve.

This invention also proposes a tooling for carrying out the process discussed, comprising the following basic elements:
  A drum for applying the lining, with the same number of arrangement positions thereof as the passes that must be done to line the entire area.
  A means of attaching the end of the lining to the mold at the beginning of each pass.
  A conical roller to exert pressure on the lining once applied on the mold uniformly along its entire width;
  Means for its movement through side guides arranged on the mold, parallel to the curved lines demarcating the piece.

Other features and advantages of this invention will be understood from the following detailed description of an illustrative embodiment of its object in relation to the attached drawings.

DETAILED DESCRIPTION OF THE INVENTION

The process and tooling object of this invention are applied to the lining on the mold 3 of an area demarcated by curved lines 5 and 7 to form a piece used in an aircraft structure.

Since the figures do not represent this area according to scale, it must be pointed out to better understand the invention that in a specific embodiment, the values of the dimensions L and H were 2240 mm and 170 mm, for the purpose of illustrating their geometric features.

Figure 1:
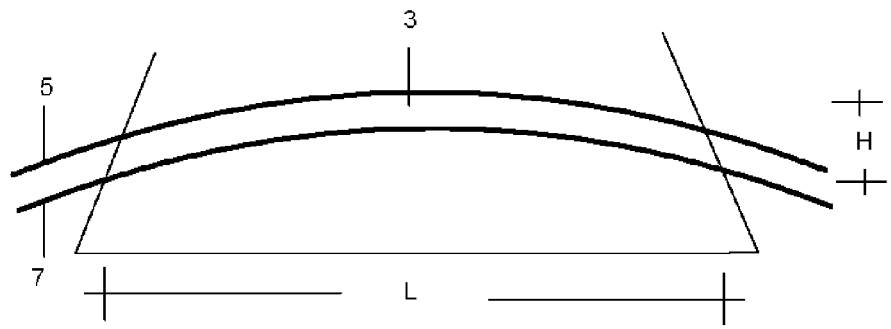
FIG. 1 shows the geometric features of the area to be lined.
Figure 2:
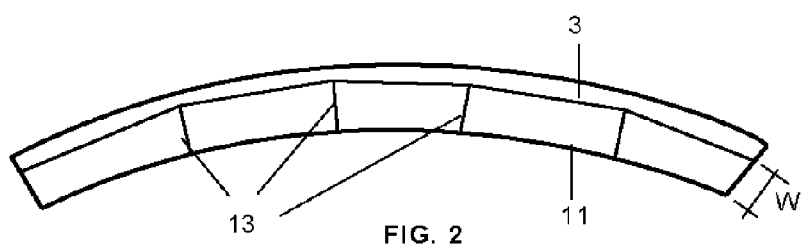
FIG. 2 illustrates the problems to be resolved by means of this invention.

As is shown in FIG. 2, the use of a lining of width W would cause undesired folds 13 in attempting to adapt to its curvature.

Figure 3A:
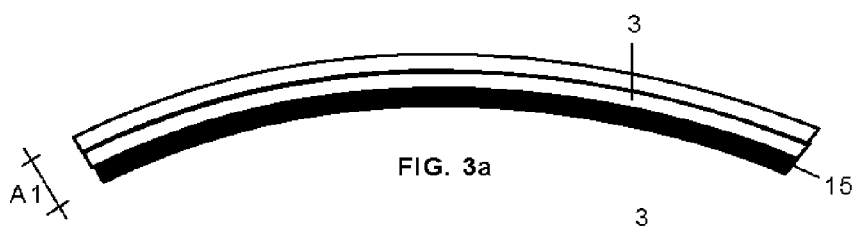
FIG. 3 illustrates the lining process according to this invention.
Figure 3B:
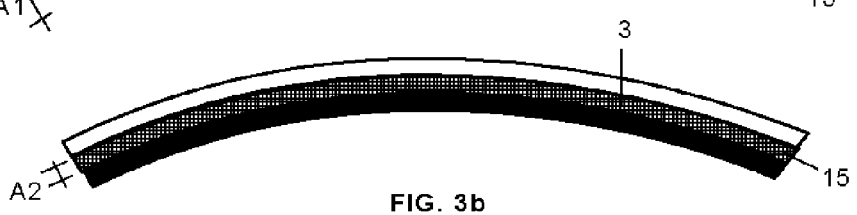
Figure 3C:

According to the invention and as is shown in FIG. 3, a lining 15 of width A2 is applied in several successive passes.

The maximum width of the lining 15 is determined according to the curvature of the area 3 such that the lining can be arranged, always exerting pressure on the material so that it deforms, following the curve. The number of passes required to line the entire area will be defined according to this maximum width, which will finally determine the width A2 of the lining 15 to cover the entire area 3 of width A1.

The lining 15 may include a protective element which must be removed at the time of its application on the mold.

Figure 4:
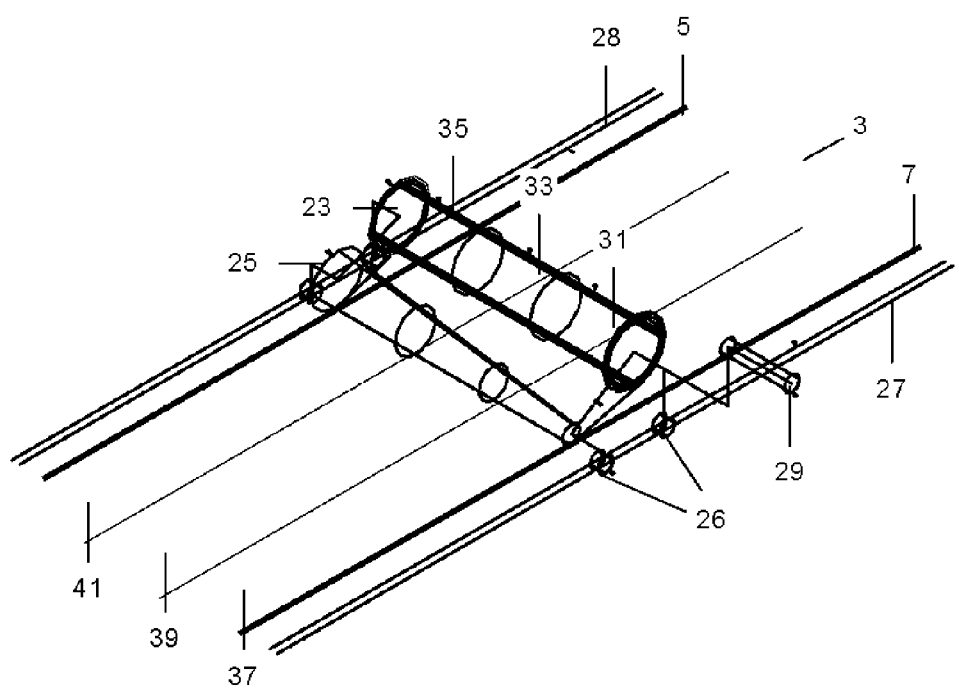
FIG. 4 shows the lining tooling of this invention.

In following FIG. 4, it can be seen that the tooling proposed by the invention comprises a drum 23 for applying the lining and a conical roller 25 to exert pressure on it. The tooling is moved on wheels 26 on side guides 27, 28 located on the mold parallel to the curved lines 5, 7 (which in FIG. 4 are represented as straight lines given the schematic nature of the figure) demarcating the piece. The movement of the tooling is carried out manually by actuating the pull 29.

The lining 15 is wound on the lining supply drum 23, including a friction clutch to maintain the stress of the lining at all times.

The supply drum 23 has three arrangement positions 31, 33, 35 of the roll of lining 15 for its application in the areas 37, 39, 41 in each one of the three passes.

The drum 23 is rigidly joined to the pressure roller 25 and remains floating, at a short distance from the ground, so that it does not interfere when exerting pressure on the lining 15.

The pressure roller 25 is conical such that as it advances on the inner curve 7 and outer curve 5, it uniformly applies pressure on the entire width of the lining. The roller 25 has three support areas corresponding with positions 31, 33 and 35 of the drum 23 and assures that in each pass, the binding of the lining that is arranged coincides with that which was arranged in the previous pass.

The tooling includes an element (not represented) to attach in each pass, the end of the lining to the mold to facilitate its arrangement.

In the event that a lining with a protective element is used, the tooling will have an element to facilitate its removal.

Any modifications comprised within the scope defined by the following claims can be introduced in the preferred embodiment described above.

The invention claimed is:

1. A tooling for applying a composite that is non-deformable by itself in lining form on a planar mold (3) to form a piece of width A1 demarcated by two parallel curved lines (5, 7), wherein said tooling applies a lining (15) of width A2 on the mold (3), following a parallel path to said curved lines (5,7), in several successive passes such that each lining is laterally bound with the lining of a previous pass, exerting pressure on the lining (15) so that it adapts to the curvature of the piece and the number of passes, being the minimum required for the width A2 of the lining (15) to allow achieving such adaptation, said tooling comprising:
   a) a drum (23) for applying the lining (15), with the same number of arrangement positions (31, 33, 35) thereof as the passes that must be given to line the mold (3);
   b) means of attaching the end of the lining (15) to the mold (3) at the beginning of each pass;
   c) a conical roller (25) to exert pressure on the lining (15), once applied on the mold (3), uniformly along its entire width; and
   d) means (26, 29) for its movement through side guides (27, 28) arranged on the mold (3), parallel to the curved lines (5, 7) demarcating the piece.

2. The tooling according to claim 1 wherein the lining (15) includes a protective element that is removed at a time it is applied on the mold (3).

3. The tooling according to claim 1, wherein the drum (23) for applying the lining (15) includes a friction clutch to maintain the stress of the lining (15).

4. The tooling according to claim 1, further comprising means for removing a protective element of the lining (15).

5. The tooling according to claim 1, wherein the drum (23) for applying the lining is rigidly bound to the pressure roller (25) and arranged a short distance from the surface of the mold (3) to facilitate the actuation of the pressure roller (25).

* * * * *